United States Patent
Zhang et al.

(10) Patent No.: US 10,115,436 B1
(45) Date of Patent: Oct. 30, 2018

(54) FILTER MEDIA AND FILTER PRODUCTS FOR ELECTRONIC ENCLOSURES

(71) Applicant: Seagate Technology LLC, Cupertino, CA (US)

(72) Inventors: Li Hong Zhang, Clementi (SG); Xiong Liu, Upper Bukit Timah (SG); Swee Chuan Gan, Bishan (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/627,856

(22) Filed: Jun. 20, 2017

(51) Int. Cl.
| G11B 33/14 | (2006.01) |
| G11B 25/04 | (2006.01) |
| B32B 9/00 | (2006.01) |
| B82Y 30/00 | (2011.01) |
| B32B 37/18 | (2006.01) |

(52) U.S. Cl.
CPC .......... *G11B 33/146* (2013.01); *G11B 25/043* (2013.01); *B32B 9/007* (2013.01); *B32B 37/18* (2013.01); *B32B 2457/00* (2013.01); *B82Y 30/00* (2013.01)

(58) Field of Classification Search
None
See application file for complete search history.

(56) References Cited

U.S. PATENT DOCUMENTS

| 4,367,503 A * | 1/1983 | Treseder | G11B 17/038 |
| | | | 360/133 |
| 5,291,355 A * | 3/1994 | Hatch | G11B 5/54 |
| | | | 360/97.11 |
| 5,436,776 A * | 7/1995 | Kurokawa | G11B 5/41 |
| | | | 360/234.3 |
| 5,734,521 A | 3/1998 | Fukudome et al. | |
| 6,077,335 A | 6/2000 | Schneider et al. | |
| 6,208,484 B1 | 3/2001 | Voights | |
| 6,270,609 B1 | 8/2001 | Markell et al. | |
| 6,475,269 B1 | 11/2002 | Turner | |
| 6,507,452 B1 | 1/2003 | Bae et al. | |
| 7,064,920 B2 | 6/2006 | Fujiwara et al. | |
| 7,388,731 B1 | 6/2008 | Little et al. | |
| 8,159,778 B2 | 4/2012 | Gao et al. | |
| 8,405,929 B2 | 3/2013 | Ghaderi et al. | |
| 8,771,630 B2 | 7/2014 | Wu et al. | |
| 9,139,439 B2 | 9/2015 | Papakonstantinou et al. | |
| 9,174,413 B2 | 11/2015 | Avouris et al. | |
| 9,466,335 B2 | 10/2016 | McGuire, Jr. | |
| 2006/0191249 A1 | 8/2006 | Gogins et al. | |
| 2009/0225470 A1 | 9/2009 | Chan et al. | |
| 2010/0310441 A1 | 12/2010 | Lapadula et al. | |

(Continued)

FOREIGN PATENT DOCUMENTS

| CN | 205216513 U | 5/2016 |
| WO | 2013/138698 A1 | 9/2013 |

OTHER PUBLICATIONS

English-machine translation of CN 205216513 U to Chen et al., published on May 11, 2016.*

*Primary Examiner* — William J Klimowicz
(74) *Attorney, Agent, or Firm* — Kagan Binder, PLLC (57) ABSTRACT

Described are filters useful in a hard disk drive of a comparable electronic device that requires a highly contaminant-free environment for operation, particularly to these devices in combination with the filter, wherein the filter contains graphene.

21 Claims, 4 Drawing Sheets

(56) References Cited

U.S. PATENT DOCUMENTS

2011/0114573 A1\* 5/2011 Simpson .............. B01D 39/083
 210/807
2012/0204722 A1 8/2012 Watkins
2014/0048411 A1 2/2014 Choi et al.

\* cited by examiner

FILTER MEDIA AND FILTER PRODUCTS FOR ELECTRONIC ENCLOSURES

FIELD OF THE INVENTION

The invention relates to hard disk drives and comparable electronic devices that require a highly contaminant-free gaseous atmosphere for operation, particularly to these devices in combination with a filter that according to the invention contains graphene.

BACKGROUND

A hard disk drive (HDD) is an electronic device that is able to store information digitally for use in a computing environment. The data is recorded on a magnetic layer of a planar, circular, rotating "magnetic disk," which is commonly referred to as a "disk" or "disc."

A typical hard disk drive includes at least one magnetic disk, and often includes multiple magnetic disks arranged as a stack of disks. A spindle motor rotates a disk while a magnetic head assembly is maintained near a surface of a disk. The head assembly includes a read head, a write head, or both. While the disk is rotated, a cushion of air is maintained between the disk surface and the head assembly, and is effective to maintain a desired distance between the disk surface and the head assembly. The head assembly is said to "fly" over a surface of the rotating disk.

The magnetic disks, heads, and appurtenant structure and devices required to allow these components to function together to store electronic data on the disks are contained in an enclosure that can include, for example, a shallow box-like metal base and a top cover to seal an opening of the base. The enclosure is sealed to prevent moisture, dust, and other types of particulate or chemical contamination from entering the enclosure, where the contamination may potentially interfere with the operation of the hard disk drive. In many such structures, a gasket is provided between the base and the top cover, and the base and top cover can be assembled to form a substantially air-tight seal. Some hard disk drive enclosures are hermetically sealed (i.e., they are "hermetic hard disk drives"). A hermetic seal is generally understood to be completely airtight. Other enclosures are substantially sealed, but not hermetically sealed, i.e., not completely air tight. These enclosures are closed and sealed with the exception of a small opening in the enclosure (usually a single hole formed in the enclosure) that allows air to flow between the interior and the exterior of the enclosure. The opening is covered by a filter, i.e., a "breather" filter or "respiratory" filter (see infra) that removes contaminants from air that passes through the opening.

For a hard disk drive to operate properly and reliably, without interruption, errors, malfunctioning, or failure, the gaseous atmosphere within its enclosure is as close as possible to free from moisture, particulate contamination, and other types of contamination such as chemical vapors, e.g., volatile organic or inorganic chemicals. Contaminants such as moisture, volatile and semi-volatile chemical vapors, and particulates, if allowed to be present at an interior of a hard disk drive enclosure, will deposit onto surfaces of magnetic disks or magnetic read or write heads. These contaminants, even in low amounts, and in a form of a vapor or a microscopic particle, if allowed to locate on a surface of magnetic disk or magnet head of a disk drive, will disrupt the proper and reliable functioning of the disk drive by causing a malfunction, error, or a catastrophic failure of the drive.

A non-moisture (i.e., organic or inorganic chemical) vapor contaminant may be derived from a component of a hard disk drive assembly, or from an environment of its manufacture. Various chemical vapor contaminants may be the result of outgassing of hydrocarbons or other chemical materials from substances or structure that becomes part of an assembled hard disk drive. Examples of such vapors include siloxanes and hydrocarbons or other organic or inorganic compounds and molecules such as those that are used in or as an oil, lubricant, solvent, adhesive, adhesive release material, plasticizer, or another material involved in the manufacture of a hard disk drive or a component of the drive. Various volatile and semi-volatile hydrocarbons and siloxanes can also be found in a cleanroom environment used for manufacturing electronic devices such as hard disk drives.

To prevent particulates (e.g., dust), moisture, and chemical contaminants from becoming present in a gaseous atmosphere of an interior of a hard disk drive or other type of electronic enclosure, filters are used to prevent entry of these contaminants into the enclosure or to remove such contaminants if present in the enclosure. One type of filter, often referred to as a breather (or respiratory) filter, can be provided at breather hole that is part of a cover or base of an enclosure. A breather filter allows air to pass between the inside and outside of the enclosure, such as due to a pressure change within the enclosure that is caused by a temperature change. The breather filter substantially prevents entry of dust, vaporized organic substances, inorganic substances, and moisture, from the outside, while allowing air to pass into the enclosure to equalize pressure. For an enclosure that is hermetically sealed, i.e., completely air tight, a breather filter is not present.

Optionally, another type of filter, a "recirculation filter," may be included at an interior location of a sealed (hermetically, or non-hermetically) disk drive enclosure. A recirculation filter is located at the interior of the enclosure, usually at a location where air is caused to circulate internally within the enclosure during use by the disks rotating within the enclosure. One or more rotating disks that are located within the enclosure cause a flow of air within the enclosure. The recirculation filter is normally placed in a path of that airflow, typically at an internal surface or support structure of the enclosure at a location adjacent to the rotating disks. Any particulates, moisture, or other contamination (e.g., organic materials) contained in the flow of air will pass through the recirculation filter and is desirably collected by the filter.

While existing hard disk drives with various types of filters (recirculating filters and breather filters) are highly useful, are commercially successful, and provide highly effective and reliable service as hard disk drive products for consumer, commercial, and industrial applications, the computer and computer storage industries sustain an expectation for constantly improving performance. Ongoing reductions in the dimensions of electronic, magnetic, and microelectronic device features, along with constantly increasing speeds and capacities at which these devices operate, result in the need for continuous improvement of each of the assemblies and components of the devices, which includes filters of products that include a filter. In magnetic disk drives, smaller dimensions and higher operating speeds result in lower tolerances for the presence of moisture, particles, and organic contamination. Continuing need exists, therefore, to reduce the presence of contamination at the interior of hard disk drive enclosures.

SUMMARY

Substantial efforts to remove contaminants from electronic product enclosures have produced highly effective filters for these applications. Yet the need for ongoing improvement remains, particularly with respect to chemical vapor contaminants, which if present within a hard disk drive enclosure can be the cause of reduced performance or complete failure. With reduced sizes of electronic features, faster operating speeds, and higher capacity devices, chemical vapors within an electronic device enclosure create even greater risk. Moreover, chemical vapors can be extremely difficult to remove by use of traditional filters, such as those made of activated carbon. Efforts made to improve cleaning effectiveness by using recirculating filters that contain activated carbon have not been completely successful, at least in part because activated carbon is not highly effective in removing chemical vapor contaminants.

According to the present invention, as described herein, an inventive filter for use in an electronic enclosure such as a hard disk drive includes adsorbent filter media that includes graphene, to adsorb chemical vapor, and another filter media such as activated carbon, to adsorb moisture. Graphene in combination with moisture-adsorbing filter media can be particularly useful as part of a filter for an electronic device, because electronic devices often contain both water vapor and chemical vapor as contaminants, and because graphene is highly adsorptive of chemical vapor and is not substantially absorptive of water vapor. Moreover, some adsorbents that are effective in adsorbing moisture, e.g. activated carbon, can have their moisture adsorbing capacity reduced substantially by the presence of a chemical vapor. With graphene present as filter media to adsorb chemical vapors, those chemical vapors are prevented from adsorbing onto the activated carbon, and the capacity of the activated carbon to adsorb water is maintained and not diminished by the chemical vapors. The moisture-repellent property of graphene can thereby extend the absorption lifetime of a filter, because the water-adsorbing capacity of the activated carbon is not diminished. The same moisture repellent-property of graphene can also allow the filter to be regenerated and re-used, because the activated carbon will adsorb a reduced amount of chemical vapors. Conventional activated carbon filters, upon adsorbing chemical vapors, are not easily regenerated and re-used, but can be re-generated if the activated carbon adsorbs only water vapor.

Due to its large absorption capacity for chemical vapor contaminants, graphene can be included as a minor ingredient in a filter, for example from about 0.1 to about 15 percent of the weight of total filter media (not including binder). Graphene has an advantageously high capacity for adsorbing chemical vapor, as compared to other filter media such as activated carbon.

In one aspect the invention relates to an electronic device that includes an enclosure, such as a hard disk drive. The enclosure includes: a base and a cover, at least one data storage disk within the enclosure, one or more heads for reading or writing data onto the disk, and a filter in fluid communication with an interior of the housing. The filter includes filter media that includes activated carbon and graphene.

In another aspect the invention relates to a method of removing contaminants from an enclosure. The method includes providing an enclosure that includes: a base and a cover, at least one data storage disk within the enclosure, one or more heads for reading or writing data onto the disk, a gaseous atmosphere comprising water vapor and chemical vapor, and a filter in fluid communication with an interior of the enclosure. The filter includes filter media that includes activated carbon and graphene. The method further includes allowing the activated carbon to adsorb the water vapor, and allowing the graphene to adsorb the chemical vapor.

BRIEF DESCRIPTION OF THE FIGURES

All figures are schematic, are illustrative and non-limiting relative to the present invention, and are not necessarily to scale.

DETAILED DESCRIPTION

A hard disk drive is an electronic storage device that stores digitally encoded data on a magnetic layer of a hard disk. The hard disk drive includes an enclosure, such as a base and a cover, which together enclose the mechanical, magnetic, and electronic and mechanical components and structures of the functioning hard disk drive assembly. Within the enclosure is at least one hard magnetic disk, optionally a stack of multiple hard magnetic disks, a spindle motor for rotating the disk or stack of disks, a magnetic head assembly useful to read and write data from a magnetic layer of a disk, and related structures such as an actuator assembly, bearings, and electronics to organize the structures and manage the use of the hard disk drive to receive, store, and allow retrieval of the digital data. It will be appreciated that, while the invention described herein emphasizes the use of filters as components of a hard disk drive enclosure, the present filters and methods may also be useful with other electronic enclosures such as optical disk drives, non-magnetic storage devices, and other enclosures for electronic or microelectronic devices, and are not limited to hard drive enclosures.

An electronic enclosure is sealed to prevent dust and other external sources of contamination from entering the interior of the enclosure where such contamination might interfere with the operation of the hard disk drive. Some example electronic enclosures (e.g., hard disk drive enclosures) are sealed hermetically, i.e., in a completely air tight fashion. Others are sealed in a non-hermetic manner that is sufficient to maintain a substantially contaminant-free interior but still allows for airflow into and out of the interior of the enclosure. Examples of non-hermetically-sealed hard disk drive enclosures include an opening (sometimes referred to as a "breather" hole) that is specifically adapted to allow air to pass between an interior and an exterior of the enclosure.

A challenge that must be met with enclosed electronic products is to reduce or prevent the presence of contaminants at an interior of an enclosure. Contaminants generally include moisture (water vapor), chemicals such as volatile organic or inorganic chemical compounds (molecules), and solid particulates such as dust. Any one of these types of contaminants has the potential to cause a hard disk drive to malfunction or fail.

In one manner, a contaminant can enter a gaseous atmosphere of an electronic enclosure during manufacturing. The contaminant may be moisture or a volatile chemical compound that is present in a clean room used to manufacture the enclosure, and may become present and trapped in the enclosure at a time when the enclosure is assembled and closed in a clean room environment.

Alternately, a contaminant may be present in a non-volatized form within a component, structure, or material that is present within the enclosure when assembled, e.g., an internal component of a hard drive assembly, and may become outgassed or otherwise volatized at a later time during the useful lifetime of the hard disk drive. The contaminant may be present in or as an organic solvent, oil, lubricant, plasticizer, binder, monomer, chemical agent, or adhesive that is contained in the enclosure, and may be any (generally low molecular weight) organic or inorganic compound (e.g., molecule) that is present in a non-volatized form as part of a material contained in the enclosure that may eventually become volatilized to exist as a vapor in the gaseous environment of the enclosure interior.

Contaminants that may be present at an interior of an electronic enclosure include solid particles (e.g., dust), generally low molecular weight chemical materials that can exist in vapor form within a gaseous atmosphere of the enclosure, and moisture. Generally, any chemical material in the form of a vapor, including water vapor, can be detrimental to the operation and reliable performance of an electronic device such as a hard disk drive. A magnetic head must be in extremely close proximity to a surface of a fast-moving hard disk during operation. The presence of any moisture or chemical material at either surface has the potential to disrupt the proper functioning of the device.

Less generally, one type of chemical contaminant that is of higher concern in the context of enclosed electronic devices is the class of chemical siloxane compounds (e.g., $[SiO(CH_3)_2]_n$). Siloxanes have a structure that includes alternating and repeating silicon and oxygen atoms, with other atoms or chemical groups (e.g., lower alkyl groups such as methyl or ethyl, etc.) attached at the alternating silicon atoms. Siloxanes can be volatile or semi-volatile, and can become present in an electronic device enclosure by being present in a structure located therein upon assembly. The siloxane may be derived directly or indirectly from any of an adhesive release liner, mold release agent, lubricant, or one of many other materials used in manufacturing an enclosed electronic device or a component of such a device. If a siloxane becomes present in a volatized (i.e., vapor) form within an electronic device enclosure, the siloxane can become attracted to and affixed at a functioning surface of the electronic device, such as a surface of a hard magnetic disk or a magnetic head. Potentially, the siloxane may oxidize and affect the transfer of data between the magnetic disk and the magnetic head, with the potential of causing a failure of the hard disk drive. Specifically, a siloxane may be tribochemically reacted to form silica or a material similar to silica deposit on a surface of a hard disk drive; the deposit can grow in size and potentially lead to a hard error and drive failure.

To reduce the presence of contaminants in a gaseous atmosphere of an interior of an electronic device enclosure, most include one or more filters at various locations of the closed device. A filter may generally include filter media contained in a porous, gas-permeable ("breathable") scrim. A filter may optionally include binder, adhesive, or other minor components or additives, as are known, that are useful to assemble the filter, to allow the filter and filter media to be held in place for proper functioning within an enclosure, or to otherwise facilitate the use of the filter and filter media for removing contaminants from an interior of an electronic enclosure. A filter may be of any size and shape, may be molded or conformable, and may generally be in a form that can be placed in fluid communication with a gaseous atmosphere of an interior of an enclosure of an electronic device.

The filter media is generally any material or substance that can physically or chemically remove a contaminant from a gaseous atmosphere. Example filter media, particularly for use to remove a chemical vapor form of a contaminant, are solid substances that can remove the contaminant by physically or chemically adsorbing the contaminant, upon contact between the contaminant and the adsorbent; the adsorbent attracts the contaminant to a surface of the adsorbent, to which the contaminant remains adhered, causing the contaminant to be removed from the gaseous atmosphere and sequestered in contact with the surface of the adsorbent.

Various types of adsorbent filter media are known in the filtration and filtration materials arts, with different general and specific adsorbent materials being useful for filtering different general or specific types of contaminants from a gaseous fluid. Example adsorbent media include physisorbers such as, but not limited to silica gel, activated carbon, activated alumina, molecular sieves, or drying agents such as clays or super-adsorbent fibers; and chemisorbents such as, but not limited to calcium carbonate, calcium sulfate, potassium permanganate, sodium carbonate, potassium carbonate, sodium phosphate, powdered or activated metals or other reactants for chemically reacting and scavenging gas phase corrodents or contaminants. An adsorbent material may effectively adsorb one or more types of contaminants, including, for example, water, water vapor, acid gas, and volatile organic or inorganic compounds including those described herein. For typical operation, an adsorbent material that is stable and adsorbs within a temperature range of −40° C. to 100° C. is preferred. Activated carbon may be suitable for many hard disk drive and other enclosed electronic devices, due to the high capacity for activated carbon to adsorb moisture.

For use in an enclosure that is desirably free of moisture and chemical vapor contaminants, when used according to the present description with graphene for removing chemical vapor contaminant, a useful type of adsorbent is one that is effective to remove water vapor. Examples include physisorbents or chemisorbents materials that function as a desiccant (i.e., a material that adsorbs or adsorbs water or water vapor), with specific useful materials including carbon adsorbents. The adsorbent may also be effective in adsorbing volatile organic or inorganic compounds, but, as described, an advantage of the use of graphene in combination with a carbon-type adsorbent for adsorbing moisture is that the graphene is particularly effective for adsorbing volatile chemical compounds, while carbon-type adsorbents are effective to adsorb water vapor but can exhibit a reduced water vapor-adsorbing effectiveness if exposed to chemical vapor contaminant. The presence of the volatile-chemical-adsorbing graphene, with a water vapor-adsorbing carbon-type adsorbent, improves the performance of the carbon-type adsorbent by preventing the carbon-type adsorbent from contacting and adsorbing volatile chemical contaminant, thus allowing the carbon-type adsorbent to maintain a higher capacity to adsorb moisture.

Filter media can be provided in the form of a granular material, optionally combined with a binder. In certain embodiments the adsorbent material is in a powder, granular, or particulate form that is held together by binder. A binder is typically dry, powdered or granular and can be mixed with the adsorbent. Examples of binders include microcrystalline cellulose, polyvinyl alcohol, starch, carboxyl methyl cellulose, polyvinylpyrrolidone, dicalcium phosphate dihydrate, and sodium silicate.

The amount of binder relative to filter media can be any useful amount. Generally, the adsorbent and some or all of the filter media of a filter are processed together by mixing or otherwise combining these material (optionally including graphene as a portion of the filter media, as described herein), with optional heat, in a manner for the binder to adhere to the filter media, and in a manner that will thus cause the binder to cause particles of the filter media (optionally including the graphene) to become adhered together. The relative amount of binder to filter media being processed with the binder (optionally but not necessarily including graphene) can be an amount by weight of binder that is less than the amount by weight of the filter media, e.g., an amount by weight of binder that is less than 50 parts by weight binder per total weight of filter media being combined with the binder, such as less than 40, 25, 20, or 15 parts by weight binder per total amount by weight of filter media being combined with the binder.

The filter includes an outer, air-permeable scrim that is effective to contain the filter media while allowing air and contaminants to pass through the scrim to allow the air and contaminants to contact the filter media. The scrim is formed into a two-layer package for the filter media, such as a pouch or envelope that may be of any desired shape. The package can be tubular and sealed at two ends, or may be made of multiple layers and sealed about a perimeter. The scrim can be of a woven or non-woven construction that is permeable to a flow of air, but that is effective to contain particles of filter media. The scrim should have a porosity that is sufficient to allow air to flow through the scrim and into contact with the contained filter media, with an adequately low (e.g., minimized) pressure drop.

A material useful for a scrim can be any material that will be permeable to a flow of air as described, that can retain particles of filter media, and that does not generate contaminants such as particulates. The scrim may be any of a variety of known porous flexible web materials that have been used as scrim material for a filter for an electronic enclosure, including flexible planar (sheet-like) or tubular, non-shedding, fibrous web materials. These include woven, non-woven, and spunbonded web materials. Example materials can be formed of or contain a heat sealable thermoplastic. Examples include fibrous, woven or non-woven flexible thin film materials such as those made of polypropylene, polyethylene, nylon, polytetrafluoroethylene (PTFE), and similar fibrous polymeric materials, as well as fibrous paper materials.

According to the present invention, as described herein, an inventive filter for use in an electronic enclosure includes filter media that includes graphene. The term "graphene" is used herein in a manner that is consistent with the use of the term in the chemical and filtering arts. The term "graphene" refers, for example, to a material that includes carbon atoms assembled into a single carbon atom-thick planar sheet with the carbon atoms being connected by sp2-bonds so that the carbon atoms form a honeycomb crystal lattice; this includes single-carbon-atom layer materials as well as multi-carbon-atom layer materials, e.g., materials that are a single carbon-atom thick or up to a few or several carbon-atoms thick, e.g., are made of from 1 and 10 layers of carbon atoms.

The graphene is included in a filter of an electronic enclosure as filter media to adsorb chemical contaminants such as volatile (vaporous) organic or inorganic chemicals. Graphene is effective in adsorbing non-water chemical vapors such as oil vapor, siloxane vapor, and other types of organic and inorganic chemicals, as opposed to water or moisture. Graphene does not substantially adsorb moisture but can be highly effective in adsorbing organic compounds (e.g., oily organic compounds); graphene can be capable of adsorbing an amount of organic vapor that is up to a few hundred times its own weight; e.g., an amount of graphene may adsorb an amount of chemical vapor contaminant that is 1, 2, 3, or more times the weight of the graphene. For comparison, activated carbon may be able to adsorb only about 30 to 40 percent of its weight of similar organic compounds (i.e., 0.3 or 0.4 times the weight of the activated carbon).

Additionally, the absorption properties of graphene are insensitive to a shape of a filter or to a shape or form of the graphene itself, which may be crushed, folded, crumpled, continuous (i.e., in a sheet), fragmented, fibrous, etc., or otherwise different from a flat planar form and still exhibit substantially equivalent absorption properties. In some embodiments, graphene may be in the form of small pieces, fragments, fibers, or particles that are admixed into or combined with other filter media and with optional binder. Example graphene particles can be in a form that has a dimension of at least about 2 microns, e.g., a dimension in a range from about 2 to about 20 microns, e.g., from about 2 to about 10 or 15 microns.

In other embodiments the graphene may be placed separately from other filter media and optional binder, e.g., may be present as a sheet or particles separate from other filter media.

Per the present description, an amount of graphene may be disposed within the filter in any form or location that will be effective for the graphene to contact and capture contaminants that pass through the filter with a flow of air. The graphene may be in a single sheet of graphene or may be in particulates, pieces, fibers, etc., of regular or irregular shapes. The graphene, in the form of a sheet, piece, or fragment, can be included in admixture and in combination with one or more other types of filter media of a filter, e.g., particles of activated carbon, in any desired and effective manner. As one example, a sheet of graphene can be included as a layer of a multi-layer filter construction, along with layers of a scrim, barrier material, etc., and adjacent to other filer media such as carbon particles (with optional binder). Alternately, small pieces or fragments of graphene can be dispersed within and among a collection of particles of one or more other types of filter media (e.g., activated carbon), optional binder, adhesive, or other minor components of a filter.

A filter can contain any useful amount of graphene per total amount of filter media. As exemplary ranges, an amount of graphene in a filter may be in a range from about 0.5 to 20 weight percent graphene per total weight filter media (not including binder), e.g., from about 0.5 to 20 weight percent graphene per total weight graphene and activated carbon. Alternate or preferred ranges can be from about 1 to about 15 or from about 1.5 to about 8, 10, or 12 weight percent graphene per total weight filter media in a filter (not including binder), e.g., from about 1 to about 15 or from about 1.5 to about 8, 10, or 12 weight percent graphene per total weight graphene and activated carbon.

In one exemplary form, a filter as described can be in the form of a breather filter, which is situated as part of an electronic device assembly at a location that will remove contaminants from air that passes through a breather hole of the assembly. In electronic devices such as hard disk drives, to prevent moisture or chemical or particulate contaminants from passing into an interior of an enclosure through a breather hole, a breather filter is placed in or over the breather hole so that air entering the enclosure must pass through the breather filter. The breather filter is located adjacent to the breather hole, usually at the interior of the enclosure, and includes filter media (typically including activated carbon) that will filter air passing through the filter to prevent the entry of dust, vaporized organic substances, inorganic substances, and moisture, into the enclosure from an external environment. According to the present description, a breather filter will contain graphene as described.

Optionally, or in the alternative, another type of filter, i.e., a recirculation filter, is also commonly included in an enclosure of an electronic device, e.g., a hard disk drive, particularly one that is hermetically sealed and that does not include a breather hole. A recirculation filter is located at an interior of enclosure and is used to filter (i.e., remove contaminants from) an internal gaseous atmosphere of the enclosure. A recirculation filter is often placed within an enclosure at a position of a flow of air within the enclosure, such as at a location that is adjacent to a moving disk or stack of disks that produces a flow of air when spinning during operation of the hard disk drive. The recirculation filter can include filter media (typically including activated carbon) that will filter the air passing through the filter, to collect any particles, vaporized organic substances, inorganic substances, and moisture, that may be present within the gaseous atmosphere of the enclosure and hat pass through the recirculation filter. According to the present description, a recirculation filter contains graphene as described.

Figure 1:
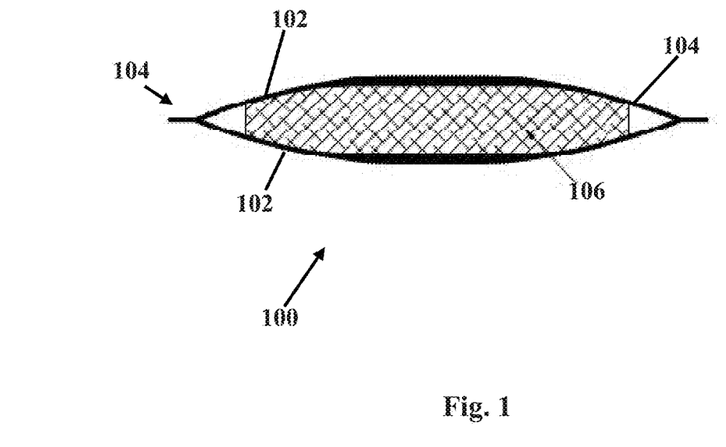
FIG. 1 illustrates an example filter of the present description.

Referring now to FIG. 1, illustrated is an example of a filter as described. Filter 100 (in cross section) includes scrim 102 on a top and a bottom, with opposed ends 104 being sealed to provide an interior that contains filter media 106. Media 106 includes graphene as described herein. As illustrated, the graphene is present in admixture with one or more other forms of filter media such as activated carbon, also optionally with binder and any one or more adjuvants or ingredients effective to facilitate or improve the filtering performance of filter 100.

Figure 2:
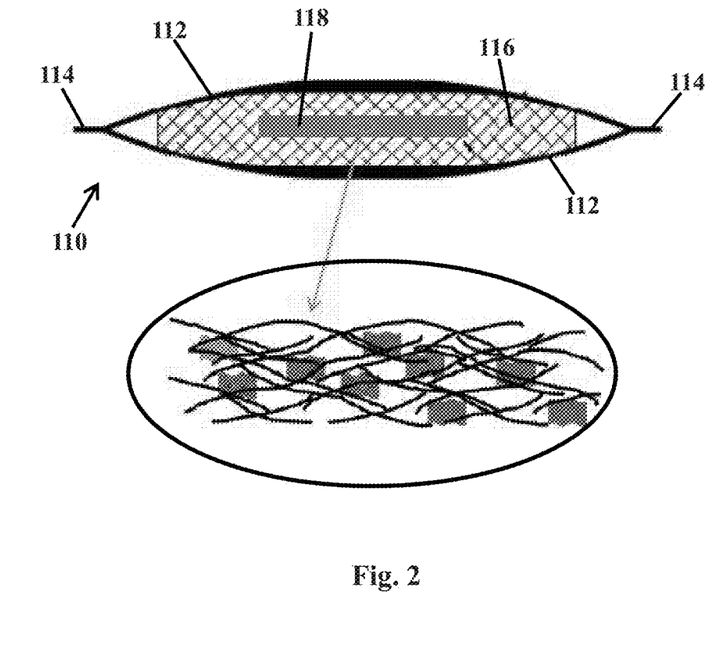
FIG. 2 illustrates an example filter of the present description.

A second embodiment of an example filter 110 is shown at FIG. 2. Referring to FIG. 2, filter 110 (shown in cross section) includes scrim 112 on a top and a bottom, with opposed ends 114 being sealed to provide an interior that contains filter media 116 and graphene portion 118. Media 116 includes one or more additional types of non-graphene filter media such as activated carbon, also optionally a binder or any one or more adjuvants or ingredients effective to facilitate or improve the filtering performance of filter 110. Graphene portion 118 includes graphene located in a concentrated amount at a central portion of filter 110. As shown at the inset, the graphene can be contained as graphene particles (or fibers, or pieces, or fragments, etc.) contained in a mixture of other materials of a filter such binder and fibrous material (e.g., felt).

Figure 3:
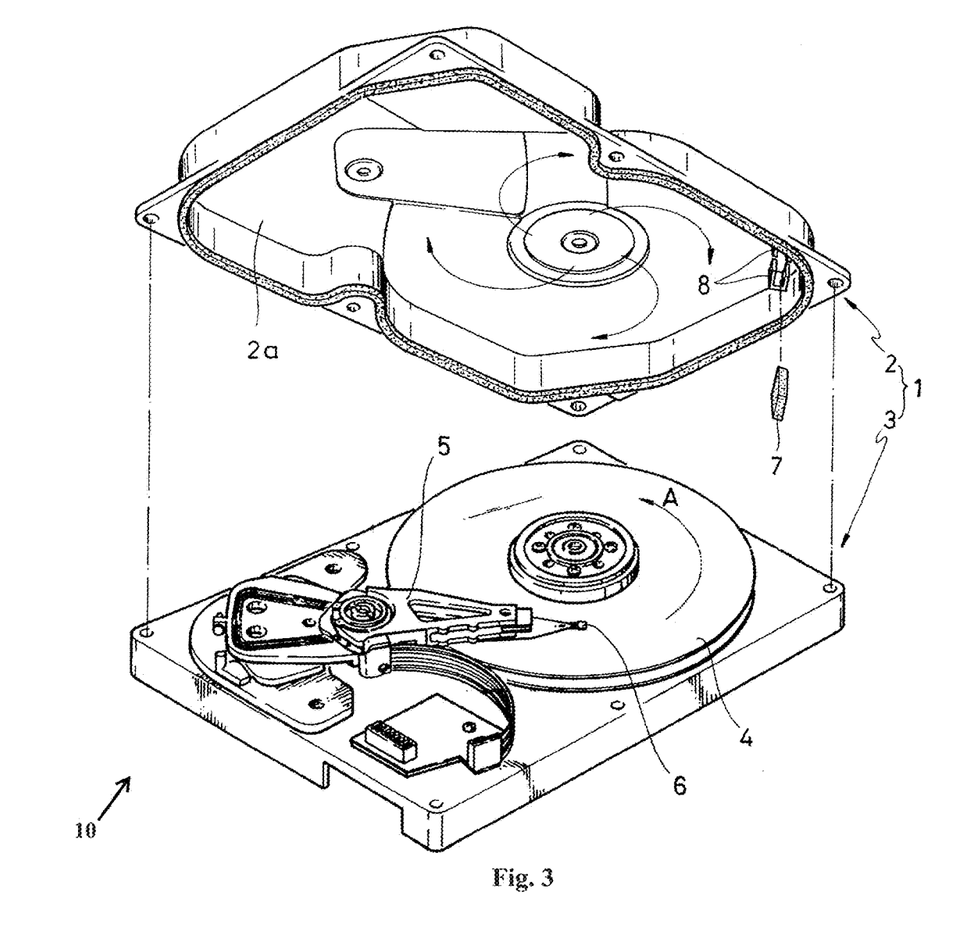
FIG. 3 illustrates an example filter and hard disk drive assembly of the present description.

FIG. 3 illustrates a filter of the present description that is included as part of a hard disk drive assembly, the filter being an example of a recirculation filter. Hard disk drive assembly 10 is useful as a memory device of a computer. Assembly 10 includes enclosure 1 made of base 3 and cover 2 assembled to produce enclosure 1 surrounding operational components of hard disk drive assembly 10. The operational components include rotatable hard disk 4 or (normally) a stack of multiple rotatable hard disks 4, and magnetic head assembly 6 held at an end portion of actuator arm 5 and at a location slightly above a surface of hard disk 4. Assembly 6 reads and writes information, digitally and magnetically, from or onto a magnetic layer of hard disk 4, which during use rotates at a high speed to produce movement between a surface of hard disk 4 and a surface of magnetic head assembly 6. Enclosure 1 can be assembled to enclose hard disk 4, actuator arm 5, assembly 6, and other mechanical and electronic supporting structures and components within a gaseous atmosphere that is sealed or substantially sealed from an external environment.

Referring still to FIG. 3, one or more filters are included as part of assembly 10. One filter, recirculation filter 7, is held in place by holder 8 near bottom 2a of cover 2 and at an internal corner of assembly 10. The location of recirculation filter 7 can be as illustrated or at any other useful internal location of an enclosure, with preferred locations being effective to place filter 7 in a path of airflow that is generated during use of hard disk drive assembly 10 with rotation of hard disk 4. The location of filter 7 shown at FIG. 3 is illustrative and non-limiting. Other locations and alternative supporting structures will also be useful, as will be appreciated. See, for example, various other locations for recirculation filters described and illustrated at U.S. Pat. Nos. 6,077,335, 6,208,484, 6,507,452 7,388,731, and 9,466,335, as well as United States Patent Application Publication 2009/0225470, the entireties of which are incorporated herein by reference.

Filter 7 of FIG. 3 is a filter as described that contains filter media that includes graphene for adsorbing non-moisture contaminants that can be present within enclosure 1 of hard disk drive assembly 10 (or any other sealed electronic device enclosure). During operation of assembly 10, hard disk 4 rotates at high speed in a direction indicated by arrow A. A flow of air that is created by the high speed rotation of hard disk 4 circulates within enclosure 1 and flows through filter 7. Contaminants such as moisture and chemical vapor contaminants that are present in the air (or other gas) that passes through filter 7 will become adsorbed by filter media of filter 7, including graphene as well as other media, for example activated carbon.

Figure 4:
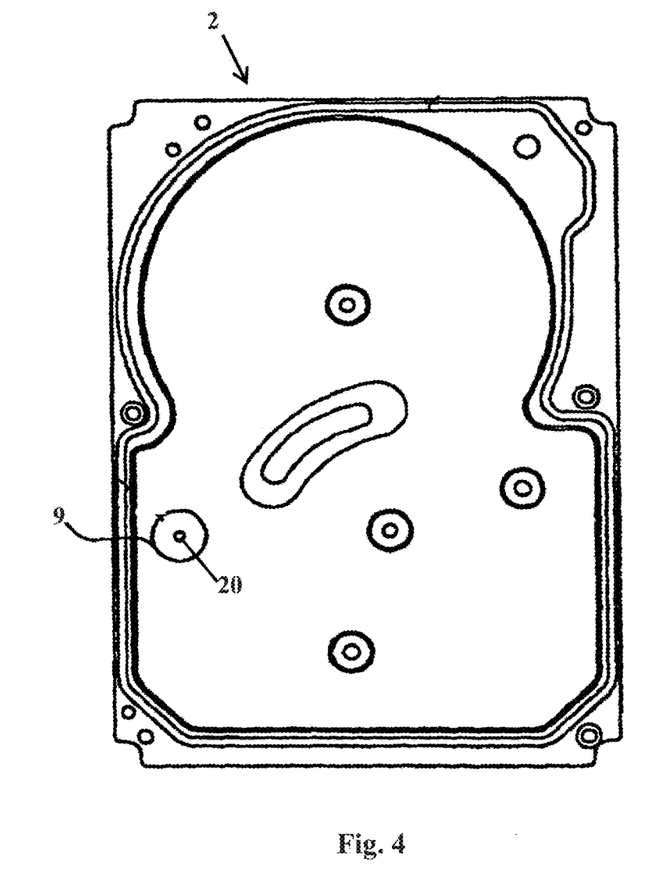
FIG. 4 illustrates an example filter and hard disk drive assembly of the present description.

Optionally, instead of or in addition to recirculation filter 7 shown at FIG. 3, an enclosure 1 of a hard disk drive assembly 10 can include a breather filter. Referring to FIG. 4, cover 2 of enclosure 1 (e.g., as illustrated at FIG. 3) is illustrated, along with breather filter 9. Cover 3 includes an inside face, which is exposed to and faces the interior of enclosure 1 when cover 2 and base 3 (not shown) are assembled. Cover 2 includes breather opening 20, which is an opening that allows air to pass through cover 2 from an interior of housing 1 to an exterior of housing 1 when cover 2 and base 3 are assembled. Also illustrated is breather filter 9, which can be placed over opening 20 so that any air that passes through opening 20 must pass through filter 9. Breather filter 9 can be held in place to cover opening 20 of cover 2 in any useful fashion, for example filter 9 may be adhered to the inside face of cover 2 and secured to that location by use of double-sided adhesive tape, adhesive, or another fastening means (not shown). The location of breather hole 20 and breather filter 9 shown at FIG. 4 are illustrative and non-limiting. Other locations for a breather hole and breather filter will also be useful. See, for example, various other locations of a breather filter described and illustrated at U.S. Pat. Nos. 6,270,609, and 7,064,929, the entireties of which are incorporated herein by reference.

Following use, or following a period of use, example filters as described can be reactivated, or re-generated, by a process (e.g., heating or exposure to chemical treatment or supercritical carbon dioxide) that will reduce the concentration of water absorbed on filter media (especially activated carbon) and that will reduce the concentration of chemical species (adsorbed chemical vapor contaminants) adsorbed on the graphene of the filter. By exemplary reactivation steps, an enclosure that contains the filter is not required to be dis-assembled; the reactivation step can be performed on the electronic device (e.g., hard disk drive) without removing the filter from the device.

The invention claimed is:

1. An electronic device enclosure comprising:
   a base and a cover,
   at least one data storage disk within the enclosure,
   one or more heads for reading or writing data onto the disk, and
   a filter in fluid communication with an interior of the enclosure, the filter comprising filter media that includes activated carbon and graphene, wherein the graphene is in the form of graphene particles having a dimension in the range of 2 to 20 microns.

2. An enclosure of claim 1 wherein the filter comprises from about 0.5 to 20 weight percent graphene per total weight filter media (not including optional binder).

3. The enclosure of claim 2 wherein graphene is present in an amount in the range of 1 to 15 weight percent of the total weight of graphene and activated carbon in the filter media.

4. An enclosure of claim 1 wherein the activated carbon is in the form of activated carbon particles and the graphene is in the form of graphene particles, and the graphene particles are admixed with the activated carbon particles.

5. An enclosure of claim 1 wherein the filter is a recirculation filter, and the filter is at a location within the enclosure that includes a flow of air produced by rotation of the disk.

6. An enclosure of claim 1 wherein the enclosure is hermetically sealed.

7. An enclosure of claim 1 wherein the filter is a breather filter, and the filter is located adjacent to a breather hole.

8. An enclosure of claim 1 wherein the enclosure contains water vapor and chemical vapor, and the activated carbon is effective to adsorb the water vapor, and the graphene is effective to adsorb the chemical vapor.

9. A method of removing contaminants from an enclosure, the method comprising:
   providing the electronic device enclosure of claim 1 further including:
      a gaseous atmosphere comprising water vapor and chemical vapor,
      allowing the activated carbon to adsorb the water vapor, and
      allowing the graphene to adsorb the chemical vapor.

10. A method of claim 9 wherein the chemical vapor comprises a siloxane.

11. A method of claim 9 wherein the chemical vapor comprises a volatile organic compound.

12. A method of claim 9 comprising re-activating the filter.

13. The enclosure of claim 1 wherein (a) the filter has an outer air-permeable scrim that is in contact with and contains the filter media, (b) the filter media is surrounded by a porous, gas-permeable scrim, or both (a) and (b).

14. The enclosure of claim 13 wherein the scrim is in the form of a pouch or envelope that contains the filter media.

15. The enclosure of claim 1 wherein the graphene particles are present in mixture with a binder, a fibrous material, or mixtures thereof.

16. The enclosure of claim 15 wherein the filter has an amount of binder, by weight, that is less than the filter media.

17. The enclosure of claim 16 wherein the filter has an amount of binder, by weight, that is less than 25 parts by weight of the combined amount of filter media and binder.

18. The enclosure of claim 1 wherein graphene is present in a concentrated amount at a central portion of the filter.

19. The enclosure of claim 1 wherein the graphene prevents the activated carbon from contacting and adsorbing chemical vapor, thus allowing activated carbon to maintain a higher capacity to adsorb moisture.

20. An electronic device enclosure comprising:
   a base and a cover,
   at least one data storage disk within the enclosure,
   one or more heads for reading or writing data onto the disk, and
   a filter in fluid communication with an interior of the enclosure, the filter comprising filter media that includes activated carbon and graphene, and wherein the filter (a) has an outer air-permeable scrim that is in contact with and contains the filter media, (b) the filter media is surrounded by a porous, gas-permeable scrim, or both (a) and (b).

21. A method of removing contaminants from an enclosure, the method comprising:
   providing the electronic device enclosure of claim 20 further including:
      a gaseous atmosphere comprising water vapor and chemical vapor,
      allowing the activated carbon to adsorb the water vapor, and
      allowing the graphene to adsorb the chemical vapor.

* * * * *